(No Model.)
J. GREER.
LUBRICATOR.
No. 484,196. Patented Oct. 11, 1892.
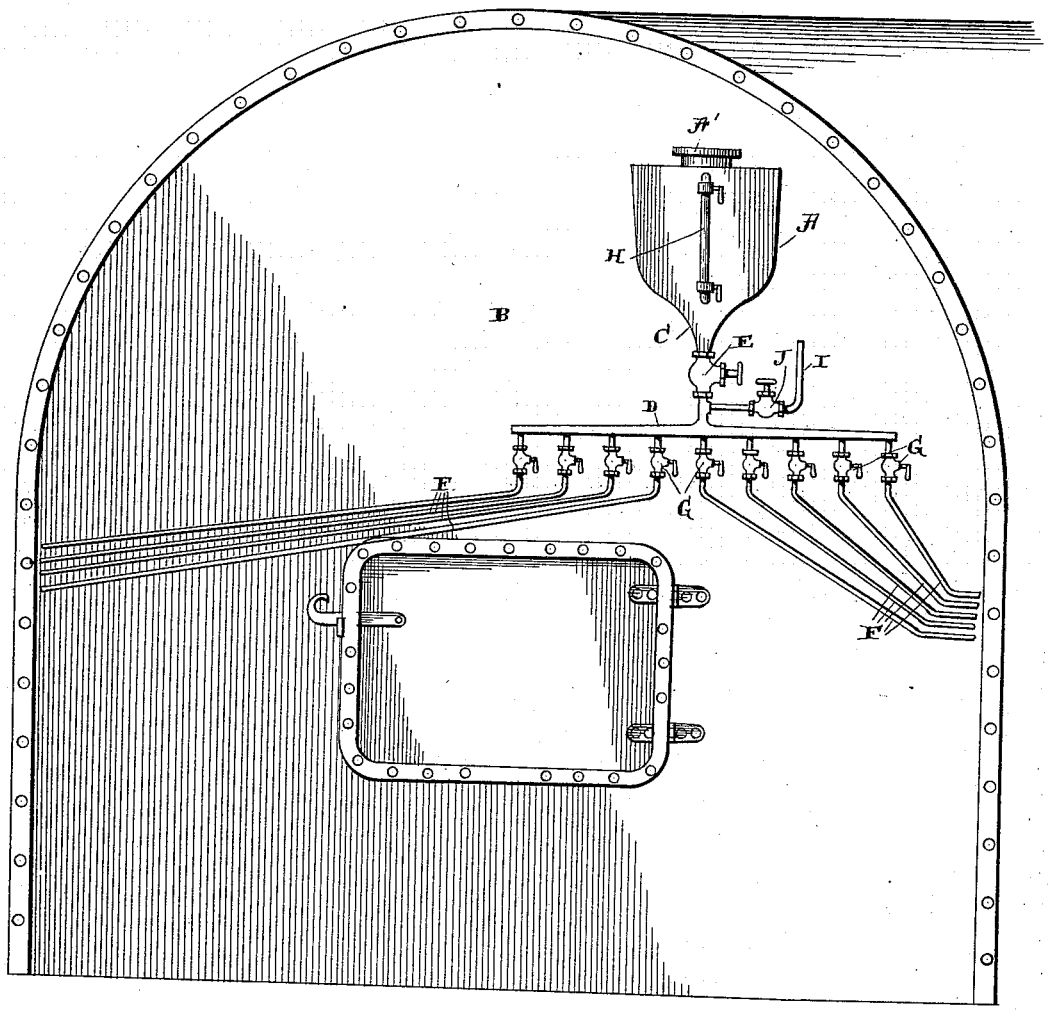
WITNESSES
Geo. E. Fitch
Roland N. Fitzgerald
INVENTOR
John Greer
per
Lehmann Pattison & Nesbit
Attys.

UNITED STATES PATENT OFFICE.

JOHN GREER, OF GREENSBOROUGH, NORTH CAROLINA.

LUBRICATOR.

SPECIFICATION forming part of Letters Patent No. 484,196, dated October 11, 1892.

Application filed January 20, 1892. Serial No. 418,654. (No model.)

*To all whom it may concern:*

Be it known that I, JOHN GREER, of Greensborough, in the county of Guilford and State of North Carolina, have invented certain new and useful Improvements in Oil-Distributers; and I do hereby declare the following to be a full, clear, and exact description of the invention, such as will enable others skilled in the art to which it pertains to make and use it, reference being had to the accompanying drawings, which form part of this specification.

My invention relates to an improvement in oil-distributers; and it consists in certain novel features of construction and in the combination and arrangement of parts which will be fully described hereinafter, and more particularly referred to in the claim hereto annexed.

The object of my invention is to provide an oil-distributer for locomotives and other engines which will convey the lubricant from a common reservoir to all points on the engine requiring oiling by means of pipes suitably connected to said reservoir and radiating therefrom to the several journals or boxes.

The accompanying drawing is a perspective view of a portion of a locomotive-boiler, showing my improved distributer mounted in position thereon.

A represents a tank or reservoir, which is supported on the boiler end B in any suitable manner and which is provided on its top with an opening A' for the reception of the oil. The lower end of this tank is formed into the neck C, which communicates with the horizontal distributing-pipe D, which is supported on the boiler-head B, immediately beneath the tank A in any suitable manner. Communication between the tank and distributing-pipes is regulated by the valve E in the neck C.

F represents pipes, which are connected at their inner ends to the distributer D and which extends outward therefrom along the sides of the boiler, as shown, and which terminate at the various points requiring the lubricant. In the ends of these pipes, adjacent the distributer D, are the cocks G, which open or close the pipes with the distributer, as may be desired. The source of supply being located above the journals to be oiled, the lubricant will be carried thereto through the several conductors by gravitation. When it is desired to oil a certain bearing, the cock G on the pipe F leading to that point will be opened, when the oil will flow freely thereto.

The tank A is provided with a glass gage H, so that the operator is informed at all times of the amount of oil in the tank, and can also ascertain whether the oil is flowing freely through the pipes F when the cocks G are opened by the receding of the oil in the glass gage. If the oil does not lower in the said tube, he knows that the pipe F then in communication with the distributer is obstructed. For clearing the said pipes of any obstructions that may accumulate therein a connection is made between the boiler and neck C, immediately below the valve E, by means of the pipe I. Mounted in this pipe I is a valve J. When the pipes F become clogged and refuse to pass the oil, the valve E is closed, thus cutting off the oil-supply, and valve G on the obstructed pipe allowed to remain open. The steam may also be used for forcing the oil to the bearings in case it becomes unusually thick or heavy, so as not to flow of its own accord. The steam connection being located as it is immediately below the valve E, it will be understood that the steam will not enter the distributing-chamber against an oil-pressure, but will have an open space in which to enter, thus having a surface of oil presented, upon which direct downward pressure is exerted. Live steam is then admitted from the boiler through the valve J into the distributing-pipe D and pipe F in communication therewith. The pressure of steam in the boiler forces the same through the said pipes with great force, driving out any obstructions that may be lodged therein and effectually cleaning the said pipes F.

The invention is here shown as applied to locomotive-engines; but it may be used as well in connection with steamship-engines or any other kind of machinery in which the points requiring oiling are at a distance from the engineer or operator.

There are bearings on many different kinds of machinery which are almost inaccessible, thus rendering oiling in the ordinary manner very difficult; but by means of my improved appliance these remote bearings are lubricated with as much ease as the journals most accessible. When used on locomotive-engines, it is more especially directed to carrying the oil to the automatic oilers which supply the crank-shafts on the driving-wheels and the eccentric-straps, as these are the points requiring the most oil. The distributer being immediately in front of the engineer or operator, it is not necessary for him to move from his position in oiling the engine.

Having thus described my invention, I claim—

In an oil-distributer, the combination of a reservoir, a distributing-pan arranged horizontally thereunder, a connection between the lower end of the reservoir and the center of the upper side of the pan, a valve on said connection, a valve steam-pipe communicating with the said connection immediately beneath the said valve, and valved distributing-pipes extending from the bottom of the said pan, substantially as shown and described.

In testimony whereof I affix my signature in presence of two witnesses.

JOHN GREER.

Witnesses:
C. M. VANSTORY,
J. W. GRIFFITH.